Patented Nov. 20, 1928.

1,692,422

UNITED STATES PATENT OFFICE.

JAMES W. SCHWAB, OF GULF, TEXAS, ASSIGNOR TO TEXAS GULF SULPHUR COMPANY, OF BAY CITY, TEXAS, A CORPORATION OF TEXAS.

METHOD OF TREATING SULPHUR.

No Drawing. Application filed March 16, 1927. Serial No. 175,935.

This invention relates to the treatment of sulphur, and more particularly to the treatment of sulphur containing impurities, such as small amounts of organic impurities, the presence of which impart to the sulphur an abnormal color or other objectionable property. The invention has for its object the provision of an improved method of treating such sulphur to improve its color and/or to ameliorate its other objectionable properties.

Sulphur is commonly produced or mined by underground fusion in accordance with the well-known Frasch process. In this process a fusing fluid, such as superheated water under pressure, is conveyed to the underground sulphur deposit where its heat is utilized in fusing the sulphur and the fused or melted sulphur is collected in the so-called sulphur wells and raised to the surface of the ground in a molten condition by suitable agencies, such, for example, as an air lift pump. The molten sulphur is then permitted to solidify and forms what is known in the industry as crude sulphur.

Crude sulphur as mined by the Frasch process is more nearly a pure substance than many carefully purified chemically pure chemicals. It often assays 99.95% sulphur and averages well over 99.5% sulphur. But crude sulphur always contains, in addition to minute amounts of inorganic matter, traces of impurities which affect its burning qualities and sometimes its color. These latter impurities are largely organic matter and are present in the sulphur on account of its contact with petroleum or bituminous substances which occur in the sulphur-bearing formations. The organic impurities are usually referred to as "oil".

Ordinary crude sulphur generally assays from 0.01% to 0.05% oil, but frequently contains larger amounts of oil. There does not seem to be any direct relationship between the amount of oil present in the sulphur and its color. Sulphur containing 0.02% oil may be dark brown in color, while other sulphur containing as much as 0.07% to 0.08% oil may be a bright yellow color.

Oil and sulphur react very rapidly at the temperatures prevailing at the burning point of sulphur itself and form black, asphaltic compounds which discolor the sulphur making it nearly black, and when burned an asphaltic film forms on the surface of the sulphur which ultimately extinguishes the flame. I have found that oil and sulphur react very slowly at the temperatures ordinarily prevailing in mining operations. If, however, crude sulphur is held for some time at the temperatures prevailing in mining operations, it loses its normal bright yellow color and becomes darker yellow or brownish in color. So, in actual mining, if sulphur as it is melted in the deposit does not happen to drain readily to a producing well, it may remain in the liquid state long enough for some of the oil to react with it and cause it to lose its characteristic bright yellow color and become dark. And, should the temperature of the molten sulphur become abnormally high so that the sulphur becomes viscous, then the color of the sulphur becomes dark more rapidly. The particular shade (that is color) of the solid sulphur probably depends upon how long it had remained in the liquid state before it finally reached a producing well and was removed from the deposit and solidified, and perhaps also, to some extent upon the temperatures attained by the sulphur while molten.

While the color of crude sulphur can be fairly well controlled by careful placing of producing wells with reference to the portion of the sulphur deposit being mined, still there are often wells that produce dark or abnormally colored sulphur. In ordinary mining practice, it seems impossible not to produce some sulphur which in chemical composition and properties is practically identical with bright yellow sulphur, but which is dark or abnormal in color. The color of this dark sulphur leads those accustomed to bright sulphur to assume that it is inferior in quality, and is, therefore, a drawback to the sale of a product which is equal in quality to bright yellow sulphur.

The present invention contemplates the provision of a method of treating dark or abnormally colored sulphur to improve its color and more particularly to remove a large portion of the oil which may be associated with the crude sulphur. The invention also contemplates the provision of an improved method of restoring dark sulphur to nearly its normal and characteristic bright yellow color, as well as the removal of impurities similar to oil which may be incorporated in the crude sulphur. In its broad aspect, the invention involves treating the sulphur in a molten condition with anhydrous aluminum chloride and subsequently separating the sulphur from the aluminum chloride and such impurities as have become associated therewith. Thus, the invention involves bringing crude sulphur containing impurities in a molten or liquid condition into intimate contact with anhydrous aluminum chloride capable of becoming associated with a part or all of the oil. After a varying period of contact, depending upon the substances to be removed, of from a few minutes to several hours, the sulphur is separated from the aluminum chloride and its associated impurities by any appropriate means. The product is sulphur with a very low oil content and an improved yellow color.

The molten or liquid sulphur may be brought into the desired intimate contact with the anhydrous aluminum chloride in any convenient manner, such as for example, by agitation. The addition of the aluminum chloride to the melted sulphur brings forth the production of a dark colored viscous body within the melted sulphur. This dark colored body is evidently a reaction product either between the sulphur and organic hydrocarbon materials contained as impurities, or between the organic hydrocarbon materials and the aluminum chloride. This reaction product may be a complex hydrocarbon salt of an unstable aluminum chloride such as disclosed in some of the oil cracking processes, as for instance, those similar to the McAfee process. This compound may be formed as a reaction product between the oil and the unstable aluminum chloride at certain temperatures; these temperatures may not be high enough to again break the product down to give the stable aluminum chloride as is claimed to take place in the vapor stage of the oil cracking processes. On the other hand, the aluminum chloride may act only as a catalyst to promote the reaction between melted sulphur and the organic hydrocarbon bodies which are present in the crude sulphur as impurities. In any event, the addition of the aluminum chloride promotes a reaction between the oil which is present as the impurity in the crude sulphur and some other body and at temperatures within the normal range of molten sulphur that is between 240° F. and 320° F. These reaction products are semi-liquid tars at the normal reaction temperature and it would seem that they must be of a fairly viscous nature as they are agglomerated by violent agitation. When little agitation is used there is practically no agglomeration of the reaction product even if a large excess of aluminum chloride is used, and under these conditions the reaction products are in such a finely divided state that they may be only partially removed by filtration. These reaction products may be almost wholly removed from the melted sulphur by the addition of suitable adsorbent reagents, such for instance as fuller's earth, diatomaceous earth, and the like. The use of these adsorbent reagents along with the use of aluminum chloride will produce sulphur of a bright yellow color and with only the slightest trace of oil remaining.

The amount of aluminum chloride reagent required varies more or less directly with the oil content of the crude sulphur. It has been found that the amount of reagent required could be determined with reasonable accuracy from the oil assay of the crude sulphur. One pound of the aluminum chloride reagent being required per long ton of sulphur for each 0.015% oil.

The amount of reagent to oil has been checked by many trials of sulphur assaying from 0.02 to 0.05% oil. In every case, the filtered product assayed less than 0.006% oil had had a color number of 2+ or better if properly agitated.

In the following table are tabulated the results of the treatment of a very high oil sulphur with varying amounts of anhydrous aluminum chloride reagent:

| Anhydrous aluminum chloride | Time of agitation in hours | Filtered product | |
|---|---|---|---|
| | | Per cent oil | Color |
| Crude sulphur | | 0.13 | 9 |
| 2.35 lbs./ton | 1 | 0.084 | 12 |
| 4.54 lbs./ton | 1 | 0.046 | 2 |
| 6.6 lbs./ton | 1 | 0.032 | 2 |
| 8.56 lbs./ton | 1 | 0.006 | 2 |
| 10.57 lbs./ton | 1 | 0.006 | 1+ |

There being no standard method of determining the gradations of discolorization of sulphur, an arbitrary system has been devised and standardized. Long familiarity with these samples enables one to accurately gauge the color of the sample without even a check comparison with the standards maintained for that purpose. The standards as far as is possible to describe the color are as follows:

| Color No. | Ordinary description |
|---|---|
| 1 | Very, very bright. |
| 2 | Very bright. |
| 3 | Bright. |
| 4 | Fairly dark. |
| 5 | Dark. |
| 6 | Very dark. |

From color No. 6 on to No. 10 the shades are proportionately darker.

In the practice of the present invention, it is possible to obtain sulphur practically free from oil by the use of very small amounts of anhydrous aluminum chloride. It would be necessary to use relatively large amounts of a very effective adsorbent for oil, such as silica gel, to obtain sulphur substantially free from oil. In either case the treatment for the removal of oil would have to be followed by treatment with a good adsorbent for color, such as fuller's earth, in order to obtain a product with a very bright color, as well as a low oil content. The particular advantage in the use of anhydrous aluminum chloride lies in the ease with which it removes practically all of the oil from the sulphur when used in relatively small quantities. By following its use by a treatment with an adsorbent for color, such as fuller's earth, a product practically equal to refined (sublimed) sulphur in color and oil may be obtained.

By means of the use of aluminum chloride, plus a good absorbent for color, it is possible to produce a product which will have a purity equal to the purity of distilled sulphur and perhaps even better. This is due to the fact that in the distilling process for the manufacture of flowers of sulphur and the like, some organic impurities are distilled over with the sulphur. By practicing the invention of the present application, these impurities are acted upon by the aluminum chloride and effectively removed by the adsorbent reagent. Thus it is possible by means of the invention, to produce products which may compete favorably with rolled sulphur and ground sulphur, since the rolled sulphur is generally a portion of the distilled product formed when trying to produce flowers of sulphur.

In the practice of the invention I do not wish to confine myself to any special method of removing the reaction products from the melted sulphur. These may be removed in any well known manner, such as settling and decanting, filtering, centrifuging and the like, nor do I wish to confine myself to the use of any definitely specified amount of anhydrous aluminum chloride reagent, but this amount may be varied to suit the particular sulphur which is being treated.

I claim:

1. The method of purifying sulphur contaminated with hydrocarbons, which comprises agitating the sulphur while molten in the presence of anhydrous aluminum chloride and separating the molten sulphur from the combined impurities.

2. The method of purifying sulphur contaminated with hydrocarbons, which comprises vigorously agitating the sulphur while molten in the presence of anhydrous aluminum chloride and separating the molten sulphur from the combined impurities.

3. The method of purifying sulphur contaminated with organic impurities in the nature of hydrocarbons, which comprises bringing an anhydrous aluminum chloride into contact with the sulphur at a temperature from 240° F. to about 320° F. and separating the combined impurities from the sulphur.

4. The method of purifying sulphur contaminated with organic impurities in the nature of hydrocarbons, which comprises agitating the sulphur while in a molten condition in the presence of aluminum chloride, adding a suitable color adsorbent material and separating the molten sulphur from the adsorbent material.

5. The method of purifying sulphur contaminated with organic materials in the nature of hydrocarbons, which comprises agitating the sulphur while in a molten condition in the presence of anhydrous aluminum chloride to form a dark colored reaction product, adding a suitable color adsorbent material and separating the molten sulphur from the adsorbent material.

6. The method of purifying sulphur contaminated with organic material in the nature of hydrocarbons, which comprises agitating the sulphur while in a molten condition in the presence of aluminum chloride at a temperature from about 240° F. to about 320° F., adding a suitable color adsorbent material and separating the molten sulphur from the adsorbent material.

7. The method of purifying sulphur contaminated with organic material in the nature of hydrocarbons, which comprises agitating the sulphur while in a molten condition in the presence of aluminum chloride to form a dark colored reaction product, adding a suitable color adsorbent material and separating the molten sulphur from the adsorbent material.

In testimony whereof I affix my signature.

JAMES W. SCHWAB.